United States Patent [19]

Murphy

[11] Patent Number: 4,817,237
[45] Date of Patent: Apr. 4, 1989

[54] CASTER PLATE RETENTION BRACKET

[75] Inventor: James F. Murphy, San Dimas, Calif.

[73] Assignee: Bel-Air Plastics, Inc., South El Monte, Calif.

[21] Appl. No.: 188,893

[22] Filed: May 2, 1988

[51] Int. Cl.$^4$ .............................................. B60B 33/06
[52] U.S. Cl. .......................................... 16/29; 16/30; 16/257; 190/18 A; 280/37; 79.1 A
[58] Field of Search ................ 16/29, 30, 31 A, 31 R, 16/257; 190/18 A; 280/37, 79.1 A

[56] References Cited

U.S. PATENT DOCUMENTS

| | | | |
|---|---|---|---|
| 3,423,786 | 1/1969 | Arias Jr. et al. | 16/257 |
| 3,685,852 | 8/1972 | Wendorf et al. | 16/29 |
| 4,731,903 | 3/1988 | Kennedy et al. | 16/257 |

Primary Examiner—Nicholas P. Godici
Assistant Examiner—Edward A. Brown
Attorney, Agent, or Firm—William W. Haefliger

[57] ABSTRACT

A bracket is provided for connection to the top plate of a wheeled caster, that top plate being generally rectangular and having lateral width $W_1$ and longitudinal length $L_1$ dimension. The bracket defines a mounting plate having an upper surface; the bracket includes a longitudinally elongated cantilevered arm of lateral width $W_2$ and longitudinal length $L_2$ where $L_2 > W_2$, the arm having one end integral with the mounting plate, and a free opposite end, there being a transverse abutment on and upstanding at the arm free end, and relative to the arm, the abutment defining a shoulder spaced from the arm free end and facing toward said one end of the arm; the bracket has two longitudinally elongated guides which are laterally spaced apart and have downward facing surfaces, the guides projecting above the level of the mounting plate upper surface to form guide channels for guiding the lengthwise reception of laterally spaced, longitudinally extending opposite edge portions of the caster top plate; the bracket has a laterally elongated stop which projects above the level of the mounting plate upper surface, the stop defining a stop surface facing toward the abutment shoulder, there being a spacing of length $L_3$ between said stop surface and said abutment shoulder, where $L_3 \cong L_1$; and the abutment shoulder normally projects above the upper surface of the mounting plate sufficiently that the arm must be yieldably deflected, by finger pressure on the abutment, to allow the caster plate opposite edge portions to slide lengthwise in the channels, whereby the caster plate may then be brought toward and into engagement with the stop shoulder as the plate rides over the abutment and then drops into confined postion between the stop shoulder and abutment shoulder, with the arm then tensioned to urge the plate into engagement with the downward facing surfaces of the guide.

10 Claims, 2 Drawing Sheets

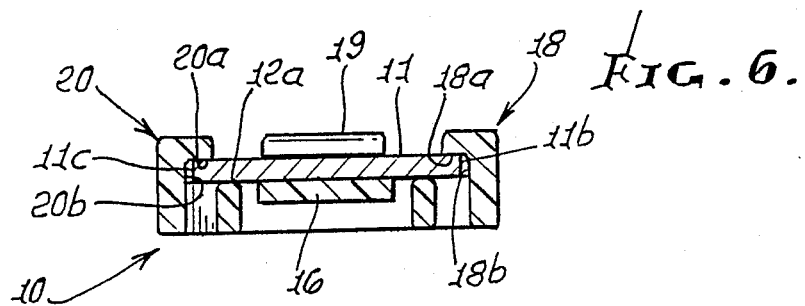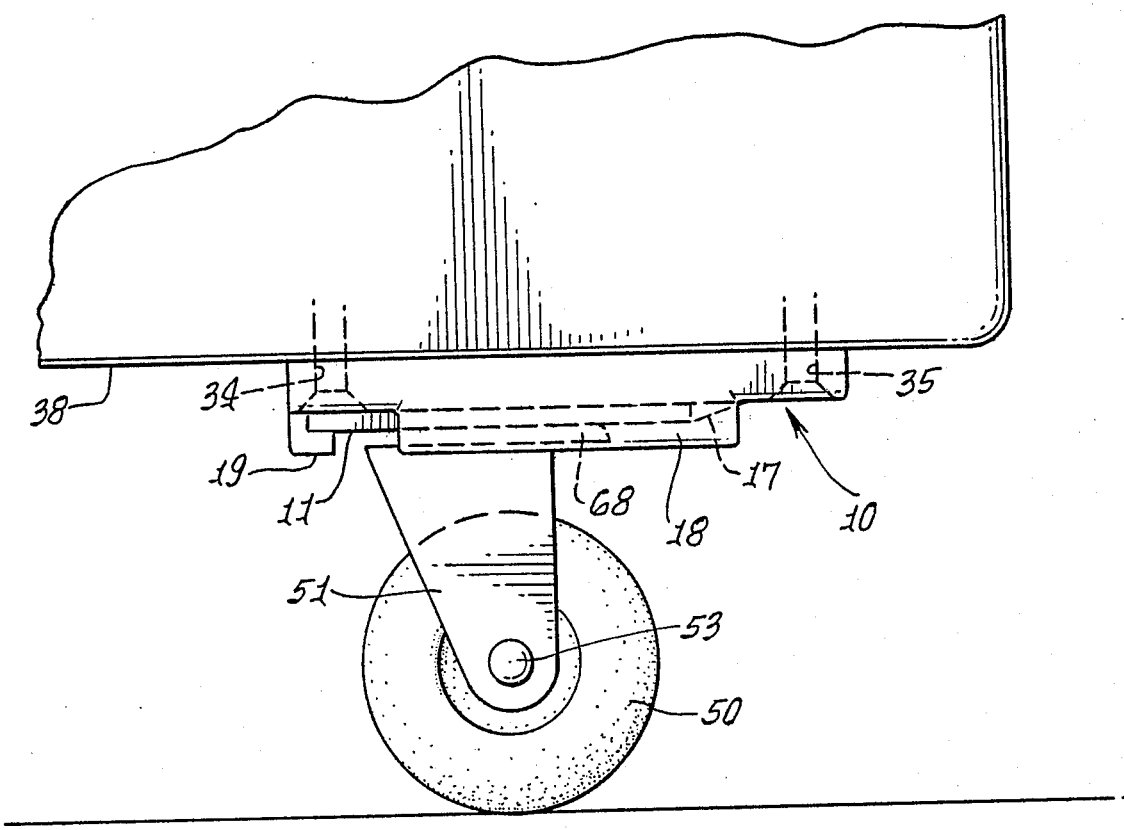

CASTER PLATE RETENTION BRACKET

BACKGROUND OF THE INVENTION

This invention relates generally to the mounting of casters to bodies to be rollably supported; and more particularly it concerns a highly advantageous bracket for quickly and securely mounting a caster plate, while allowing quick removal of the caster plate as desired, the bracket being attached to a body such as luggage (for example).

There is need for means to quickly and easily attach casters to luggage, and other heavy bodies, as for example at air terminals, for ease of transporting such luggage or bodies; also, there is need for associated means to quickly and easily detach the casters from the luggage or bodies, following such transport. Finally, there is need for improvements in the construction and functioning of such caster mounting means, and especially the reliability of same, and at the same time enabling low-cost production of such devices.

SUMMARY OF THE INVENTION

It is a major object of the invention to provide an improved caster mounting bracket meeting the above needs. Such a bracket in accordance with the invention is quickly connectible to the top plate of a wheeled caster, that plate being generally rectangular and typically having lateral width $W_1$, and longitudinal length $L_1$. The bracket itself defines a mounting plate having an "upper" surface, in inverted position of the mounting plate (as would be the condition when the luggage is placed bottom side up, for quick mounting of the caster or casters).

It is a further object to provide such a bracket having a longitudinally elongated cantilevered arm of lateral width $W_2$ and longitudinal length $L_2$ where $L_2 > W_2$, the arm having one end integral with the mounting plate, and a free opposite end, there being a transverse abutment on and upstanding at the arm free end, and relative to the arm, said abutment defining a shoulder spaced from the arm free end and facing toward said one end of the arm.

It is a still further object to provide such a bracket having two longitudinally elongated guides which are laterally spaced apart and have downward facing surfaces, said guides projecting above the level of said mounting plate upper surface to form guide channels for guiding the lengthwise reception of laterally spaced, longitudinally extending opposite edge portions of the caster top plate.

It is a yet further object to provide such a bracket having a laterally elongated stop which projects above the level of said mounting plate upper surface, said stop defining a stop surface facing toward said abutment shoulder, there being spacing of length $L_3$ between said stop surface and said abutment shoulder, where $L_3 \cong L_1$.

A still further object is the provision of such an abutment shoulder to project normally above the upper surface of the mounting plate sufficiently that the arm must be yieldably deflected, by finger pressure on the abutment, to allow said caster plate opposite edge portions to slide lengthwise in said channels, whereby the caster plate may then be brought toward and into engagement with said stop shoulder as the plate rides over the abutment and then drops into confined position between said stop shoulder and said abutment shoulder, with the arm then tensioned to urge the plate into engagement with downward facing surfaces of the guides.

Further, the bracket desirably consists of a one-piece, durable molded plastic unit; the abutment typically has a top surface which slopes directionally longitudinally away from the stop shoulder and downwardly; that abutment surface is normally above the level of said mounting plate upper surface, until deflected downwardly by pressure to accept the caster plate into said confined position; and the arm also has an upper surface which normally is sloped away from the stop shoulder and upwardly, toward said abutment shoulder.

These and other objects and advantages of the invention, as well as the details of an illustrative embodiment, will be more fully understood from the following specification and drawings, in which:

DRAWING DESCRIPTION

FIG. 5 is a view of the caster mounted to luggage, by the bracket; and

FIG. 6 is an enlarged section on lines 6—6 of FIG. 1.

DETAILED DESCRIPTION

Figure 4:
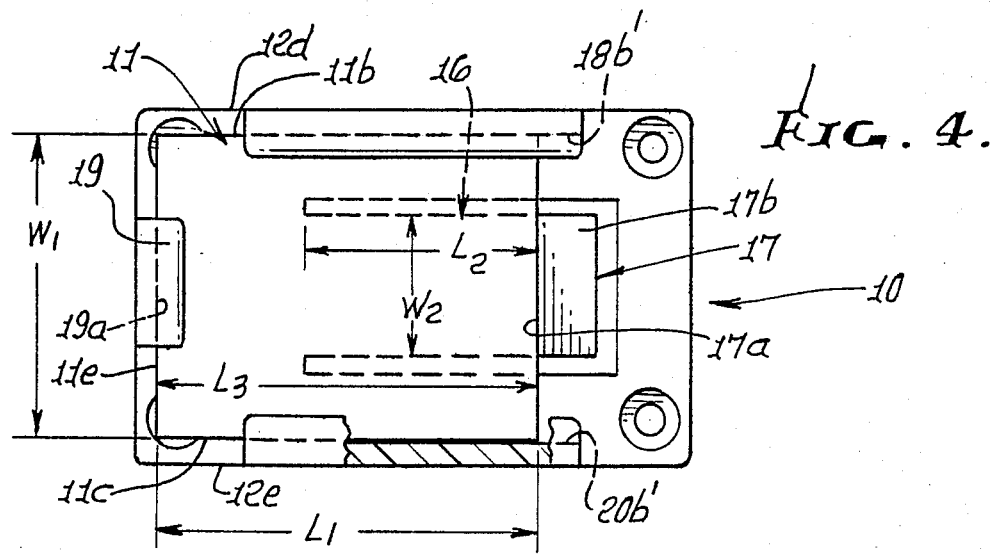
FIG. 4 is a view like FIG. 1, showing the caster plate in confined position.

The bracket 10 shown in the drawings is adapted to support a caster plate 11. As seen in FIG. 5, the plate 11 is located above a caster wheel 50 and is supported by a U-shaped member 51 from which caster wheel 50 extends. Axle 53 supports the wheel and is carried by the member 51. Generally rectangular plate 11 has lateral width $W_1$ and longitudinal length $L_1$, as better shown in FIG. 4.

The bracket 10 defines a mounting plate or base plate 12. The latter defines through slots 13-15 extending along opposite sides and at and end of a longitudinally elongated cantilevered retention arm 16 of lateral width $W_2$ and longitudinal length $L_2$, where $L_2 > W_2$. The arm 16 at one end 16a thereof is integral with the plate 12. The opposite end 16b of the arm is free i.e. movable up and down. A transverse abutment 17 is on and upstanding relative to the arm at the arm free end; and the abutment 17 defines a shoulder 17a spaced from the arm end 16b and facing toward the arm end 16a. Arm 16 is integral with plate 12.

The bracket also has two longitudinally elongated guides or holders 18 and 20 which are laterally spaced apart at opposite sides of the plate 12. The guides have downwardly facing surfaces 18a and 20a to engage the upper side of the caster plate, as seen in FIG. 6. The guides project above the level of the mounting plate upper surface 12a, and typically over that surface as seen in FIG. 6; thereby to form guide channels 18b and 20b for closely guiding the lengthwise reception of laterally spaced, longitudinally extending opposite edge portions 11b and 11c of the caster plate 11.

The bracket also has an integral, laterally elongated stop 19 which projects above the top surface level 16a of base plate 16. The step defines an interior stop surface 19a facing toward the abutment. The stop and surface 19a are generally centered at an end of plate 12, and mid-way between opposite laterally spaced edges 12d and 12e. The stop overhangs surface 12a, at 19c. The spacing between the stop surface 19a and abutment shoulder 17a is designated at $L_3$, where $L_3 \cong L_1$.

The abutment shoulder 17a normally projects above the upper surface level 12a of the plate 12, sufficiently that the arm must be forcibly and resiliently yieldably downwardly deflected by finger pressure on the top of the abutment, (as indicated by arrow 65), so as to allow the caster plate to ride over the abutment and to enter and slide lengthwise in the channels 18b and 20b. See FIGS. 3 and 4. As a result, plate 11 may then be frictionally pushed or brought toward and into engagement with the stop shoulder (see plate forward end 11e engaging 19a in FIG. 4), as the plate 11 rides over the abutment 17 and then drops into endwise confined position between stop shoulder 19a and abutment shoulder 17a. At this time, the arm remains tensioned to exert upward force on the plate 11, urging it upwardly so that its opposite edge portions 11b and 11c frictionally engage the downward facing surfaces 18a and 20a of the elongated guides or holders 18 and 20. The plate 11 is thereby snugly confined on all four edges by the elements 17, 18, 19 and 20, preventing skewing of the plate 11 relative to plate 12, and proper caster functioning is assured. Note the caster rotary bearing location at 68, in FIG. 5. Preferably, the bracket consists of a tough, durable, molded plastic unit, one example being ABS.

Figure 3:
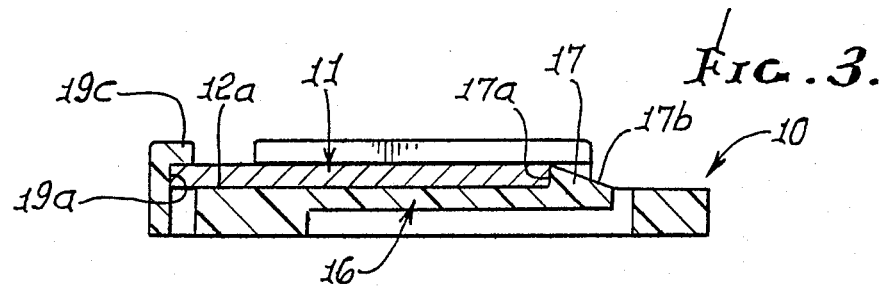
FIG. 3 is a view like FIG. 2, but showing a caster plate confined by the arm, abutment, and channels.

The abutment 17 preferably has a top surface 17b which slopes directionally longitudinally away from the stop shoulder 19a, and also downwardly. This facilitates downward finger pressure exertion on surface 17a, as referred to, and also allowing camming of the plate 11 over the abutment, progressively urging it downwardly, as the plate 11 is slid leftwardly. Surface 17b is normally above the level of plate surface 12a until deflected downwardly by pressure to accept the caster plate into "snap-in", confined position, as seen in FIG. 3. Note that surface 17b is in lateral alignment with the entry ends 18b' and 20b' of the channels 18b and 20b, to facilitate such entry as the surface 17b is depressed.

Figure 1:
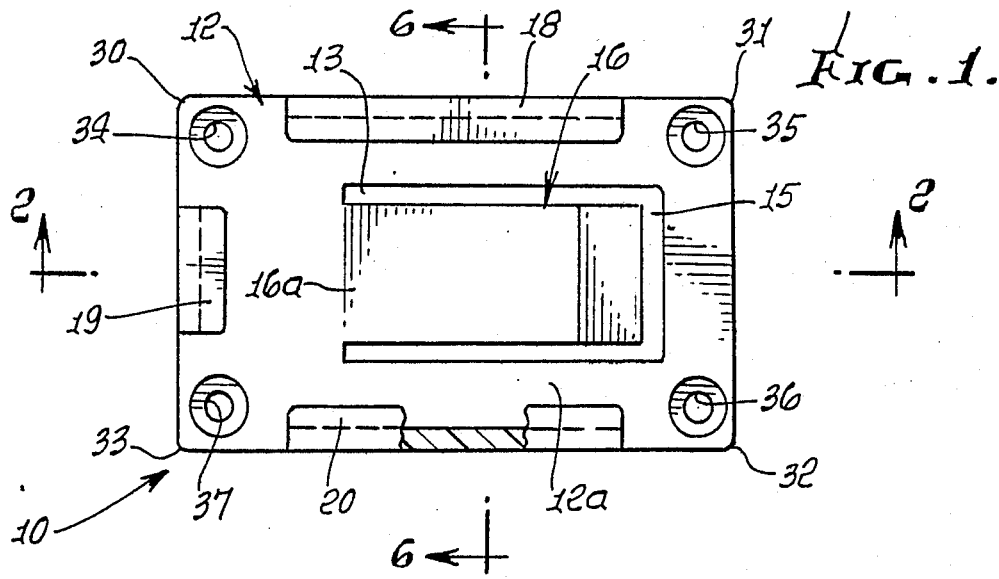
FIG. 1 is a top plan view of a bracket incorporating the invention.
Figure 2:
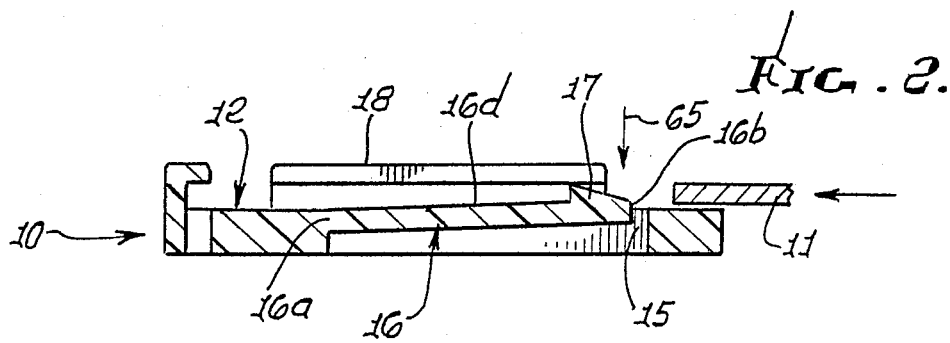
FIG. 2 is a section taken on lines 2—2 of FIG. 1.

Also, arm 16 has an upper surface 16d which normally slopes away from shoulder 19a and upwardly, toward abutment shoulder 17a, in FIG. 2 (prior to entry of plate 11 into the guide channels).

Guides 18 and 20, and stop 19 have inverted L-shaped cross section in planes normal to their lengths.

The plate 12 has corners 30-33 and defines fastener openings 34-37 proximate such corners. Thus, the plate can be permanently attached to luggage or other body wall 38 (see FIG. 5), yet allows quick, snap-in of the caster plate, as described, as well as detachment of the plate. To that end, abutment top surface 17b is merely depressed, allowing plate 11 to be slid out over the abutment.

I claim:

1. In a bracket for connection to the top plate of a wheeled caster, that top plate being generally rectangular and having lateral width $W_1$ and longitudinal length $L_1$ dimension, the combination comprising:
    (a) said bracket defining a mounting plate having an upper surface,
    (b) the bracket including a longitudinally elongated cantilevered arm of lateral width $W_2$ and longitudinal length $L_2$ where $L_2 > W_2$, the arm having one end integral with the mounting plate, and a free opposite end, there being a transverse abutment on and upstanding at the arm free end, and relative to the arm, said abutment defining a shoulder spaced from the arm free end and facing toward said one end of the arm,
    (c) said bracket having two longitudinally elongated guides which are laterally spaced apart and have downward facing surfaces, said guides projecting above the level of said mounting plate upper surface to form guide channels for guiding the lengthwise reception of laterally spaced, longitudinally extending opposite edge portions of the caster top plate,
    (d) and said bracket having a laterally elongated stop which projects above the level of said mounting plate upper surface, said stop defining a stop surface facing toward said abutment shoulder, there being spacing of length $L_3$ between said stop surface and said abutment shoulder, where $L_3 \cong L_1$,
    (e) The abutment shoulder normally projecting above said upper surface of the amounting plate sufficiently that the arm must be yieldably deflected, by finger pressure on the abutment, to allow said caster plate opposite edge portions of slide lengthwise in said channels, whereby the caster plate may then be brought toward and into engagement with said stop shoulder as the plate rides over the abutment and then drops into confined position between said stop shoulder and said abutment shoulder, with the arm then tensioned to urge the plate into engagement with downward facing surfaces on the guides,
    (f) said bracket being of one-piece molded plastic construction, said abutment having a top surface which slopes directionally longitudinally away from the stop shoulder and downwardly, said cantilevered arm projecting upwardly proximate its free end so that substantially the entire abutment upper sloping surface being normally about the level of said mounting plate upper surface, until progressively deflected downwardly by camming pressure exerted by an edge of the caster plate to accept the caster plate into said confined position, said upper sloping surface extending throughout the major width of said arm.

2. The combination of claim 1 wherein said plastic consists of ABS.

3. The combination of claim 1 wherein said arm has an upper surface which normally is sloped away from the stop shoulder and upwardly, toward said abutment shoulder in its relaxed state.

4. The combination of claim 1 wherein said stop is defined by a laterally elongated member defining a laterally elongated channel for reception of the forward edge portion of the caster plate.

5. The combination of claim 4 wherein said member has an inverted L-shaped cross-section in upright, lateral planes.

6. The combination of claim 1 wherein said guides have inverted L-shaped cross section in upright longitudinal planes.

7. The combination of claim 1 wherein the mounting plate has corners and defines fastener through openings, proximate said corners.

8. The combination of claim 7 including luggage attached to said mounting plate via fasteners in said through openings.

9. The combination of claim 1 including said caster plate in said confined position.

10. The combination of claim 8 including said caster plate in said confined position.

* * * * *